UNITED STATES PATENT OFFICE.

CARL VALDEMAR JØRGENSEN, OF COPENHAGEN, DENMARK.

METHOD OF TREATING PYROLUSITE.

1,303,911.      Specification of Letters Patent.      Patented May 20, 1919.

No Drawing.      Application filed December 14, 1918. Serial No. 266,806.

*To all whom it may concern:*

Be it known that I, CARL VALDEMAR JØRGENSEN, a subject of the King of Denmark, residing at No. 7 Haraldsgade, Copenhagen, in the Kingdom of Denmark, have invented new and useful Improvements in Methods of Treating Pyrolusite, of which the following is a specification.

This invention refers to a method of treating pyrolusite in its different natural varieties, in order to increase its reactionary powers.

As is well-known, the natural peroxid of manganese occurs partly together with the lower oxids of manganese, which have a diluting effect, and partly together with foreign substances, especially silicon compounds, which have an enveloping, petrifying effect, whereby the reactionary power is decreased.

According to the invention, this natural condition, which is detrimental to the reactionary power, is counteracted by mixing suitable alkaline compounds, alkali-metal hydroxids or alkali-metal salts, in comparatively small quantities, with the pulverized pyrolusite sufficient to react with the silicates present and heating the mixture to red heat. Then, as shown by experience, the liberation of oxygen which occurs when the pyrolusite is heated above 210 degrees Celsius by itself alone in the air will be avoided. On the other hand a formation of manganate is avoided as a result partly of the high temperature and partly of the small quantities and the nature of the alkaline compounds used. Furthermore the foreign compounds and, on the whole, the natural qualities of the pyrolusite are affected in such a manner that the product, after being washed and, eventually treated with acids, shows an essentially increased reactionary power. In these respects this invention differs essentially from the already known treatment of pyrolusite by means of heating under pressure together with a solution of caustic alkali.

I claim:

1. The method of increasing the power of reaction of pyrolusite which consists in first pulverizing the pyrolusite, then adding thereto a comparatively small quantity of alkaline compounds, heating the mixture to red heat, and finally washing the product.

2. The method as set forth in claim 1, in which alkali-metal hydroxids are used.

In testimony whereof I have signed my name to this specification.

CARL VALDEMAR JØRGENSEN.